United States Patent [11] 3,616,011

[72] Inventor Gilbert D. Endrizzi
 Wisconsin Rapids, Wis.
[21] Appl. No. 781,010
[22] Filed Dec. 4, 1968
[45] Patented Oct. 26, 1971
[73] Assignee Consoweld Corporation
 Wisconsin Rapids, Wis.

[54] PROCESS OF MAKING TEXTURED MOLDING CAULS
 4 Claims, 1 Drawing Fig.

[52] U.S. Cl. .................................................. 156/219,
 156/247, 156/289, 156/292, 156/309, 156/313
[51] Int. Cl. ........................................................ B31f 7/00
[50] Field of Search .......................................... 156/242,
 245, 306, 196, 212, 213, 228, 289, 292, 219, 309,
 313, 247

[56] References Cited
 UNITED STATES PATENTS

| | | | |
|---|---|---|---|
| 3,149,017 | 9/1964 | Ehrreich et al. | 156/289 UX |
| 3,215,579 | 11/1965 | Hagen | 156/289 |
| 3,303,081 | 2/1967 | Michaelson et al. | 156/289 X |
| 3,311,520 | 3/1967 | Michaelson et al. | 156/289 X |
| 3,373,068 | 3/1968 | Grosheim et al. | 156/289 X |
| 3,418,189 | 12/1968 | Grosheim | 156/289 X |
| 3,454,457 | 7/1969 | Hale et al. | 156/289 X |

*Primary Examiner*—Carl D. Quarforth
*Assistant Examiner*—Stephen J. Lechert, Jr.
*Attorney*—Gary, Parker, Juettner, Pigott & Cullinan

ABSTRACT: Process of making textured molding cauls from normally consumable textured originals comprising the steps of sandwiching a consumable textured original between a pair of thin flexible resin impregnated sheets, forcing said sheets intimately into the surface recesses of said original, setting the resin in said sheets, and using the resin-set sandwich of said original and said sheets as a master molding caul.

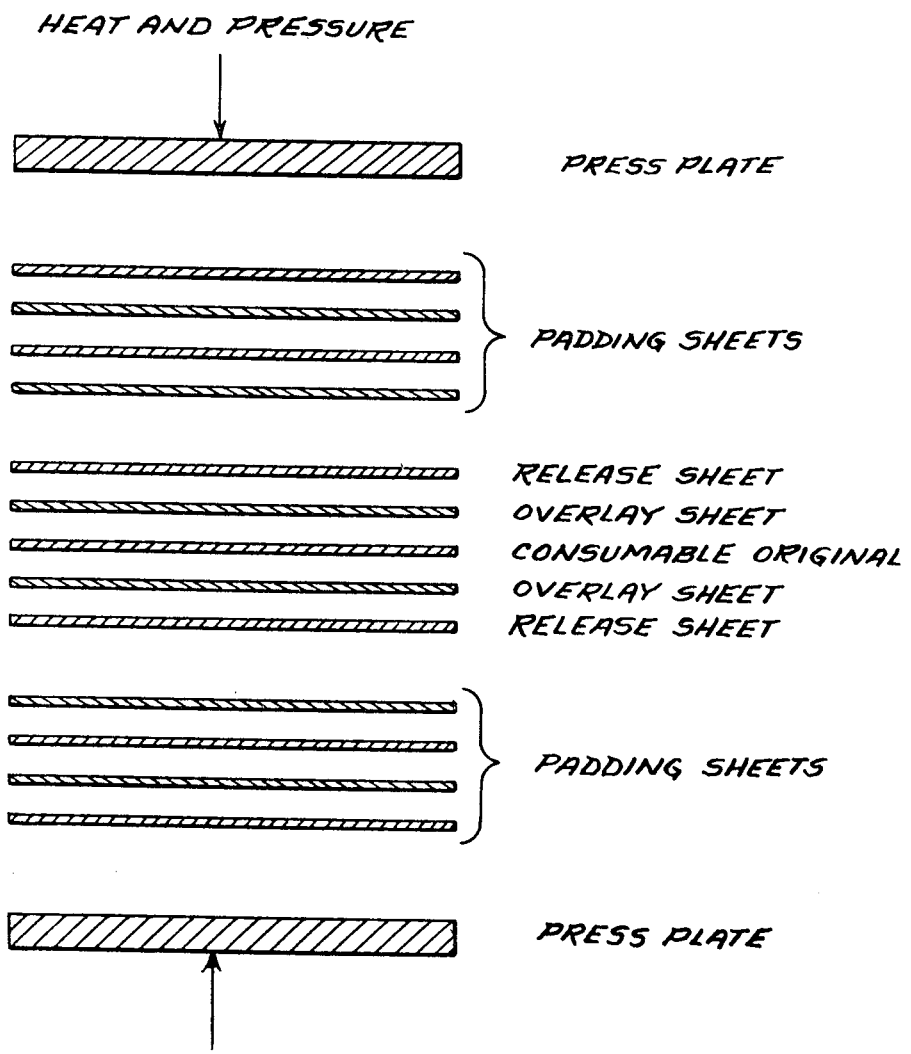

PROCESS OF MAKING TEXTURED MOLDING CAULS

In order to acquaint those skilled in the art with the manner of making and using "permanentized" textured master molding cauls comprised of a consumable original, I have shown and will now describe the best mode presently contemplated by me of carrying out my invention.

In the art of making plastic laminates, a core comprised of several sheets of kraft paper or the like impregnated with a thermosetting resin, a print sheet bearing a decorative pattern, and an essentially transparent overlay sheet impregnated with a melamine thermosetting resin are laminated together under heat and pressure to form a unitary thermoset plastic sheet or board having a hard, wear resistant, decorative surface. This surface is usually formed by placing a metal caul plate against the overlay sheet during the application of heat and pressure to cause the ultimate product to mirror the surface of the caul, from which the laminate is removed upon completion of the thermosetting process. The caul may be variously treated to impart particular characteristics to the surface of the laminate, e.g., high gloss, semigloss, matte or dull finishes, etc.

In addition, the metal caul plate may be textured so as to impart a textured or three-dimensional effect to the surface of the finished laminate. So long as the texture is very simple, for example, straight lines or the like, the caul plate may be produced at a justifiable cost. However, even metal caul plates have a limited service life and when textured patterns are more intricate, the cost of producing metal caul plates becomes prohibitive.

According to the present invention, master molds for production of intricate surface textures may be economically and practically produced and used even where the model for or the original of the texture design is of such character that it would normally be consumed, destroyed, distorted, irreparably damaged, or otherwise rendered unusable after a single laminate producing operation, or a limited number of such operations.

For example, assume that it were desired to reproduce the pattern and texture of a piece of lace on the surface of a plastic laminate. To first reproduce the pattern of a steel caul plate would be prohibitively expensive. To try to use the lace directly as the master would result in destruction of the lace on the first attempted molding operation. To use the lace as a master for production of a plastic laminate negative molding caul, as recently proposed by others, results in destruction of the lace in the production of the first negative, and since a plastic laminate negative and the positive plastic laminate cauls produced therefrom inherently have limited production life, this process suffers serious limitations in satisfying the quality standards and mass production requirements of today's market.

Where the original is one of a kind, the process is amplified by repetitive practice of the added steps of producing two plastic laminates from said resin-set master, sandwiching a resilient pad of resin impregnated sheets between said laminates, forcing said laminates against said pad to reproduce the surface recesses of the original on said pad, setting the resin in the sheets comprising said pad, and using the resin-set pad as the molding caul.

Where the original constitutes a positive of the texture desired to be reproduced on the surface of the plastic laminates, rather than a negative thereof as inherent in the above, the process is amplified by using either the master molding caul containing the original, or one of said resin set pad reproductions thereof, as a positive mold for production of negative molds from which the laminates may be produced.

THE DRAWING

The drawing shows the assembly of components necessary to production of a resin-set master comprised of a textured consumable original sandwiched between a pair of resin impregnated sheets.

DESCRIPTION

According to this invention, the problem is solved by making the original into a permanent master, or at least a semipermanent master.

As shown in the drawing, the consumable original is sandwiched between a pair of resin impregnated or resin containing overlay sheets of a size slightly larger than that of the original. The overlay sheets and the resin therein may be any of a wide variety of acceptable materials, such as various types of paper impregnated with various thermosetting resins, for example, phenolic, epoxy, urea formaldehyde and other resins. In some instances, it may even be feasible to use thermoplastic films for the overlay sheets, such as vinyl films that would flow into and intermarry in the openings or interstices of an open-work original. However, I prefer to employ very thin paper sheets impregnated with a thermosetting resin; specifically, alpha cellulose paper of about 0.003-inch thickness impregnated with a melamine resin.

Melamine impregnated alpha cellulose paper is a product well known and readily available to all plastic laminate manufacturers, as it is the overlay sheet customarily employed in the production of decorative plastic laminates; the same constituting the surface-forming sheet of the laminates. I prefer these sheets because they afford the advantages of economy, ready availability, flexibility and thinness for conformance to and faithful reproduction of the surfaces of the original, and transparency to reveal fully the encased original.

In the assembly shown in the drawing, each of the overlay sheets is covered by a release sheet and the release sheets in turn are each engaged by a stack of padding sheets. The purpose of the release sheet is to facilitate separation of the padding sheets from the overlay sheets upon completion of the master mold. The padding sheets, which may suitably be several sheets of the kraft paper conventionally used as laminate core stock, comprise means forming highly economical and readily available resilient molding pads.

The resulting assembly of the original, the two overlay sheets, the two release sheets and the two resilient pads is then placed in a molding press, whereupon two opposed press plates are brought into engagement with the opposite surfaces of said assembly to apply pressure thereto. Sufficient pressure is applied to the assembly to cause the resilient pads formed by the padding sheets to conform to and to force the overlay sheets into intimate conformance with the opposite surfaces of the original, to cause the inner surfaces of said overlay sheets to mirror or be negatives of the surfaces of the original and to cause the outer surfaces of said overlay sheets to very closely simulate if not exactly duplicate the surfaces of the original. Sufficient heat is then applied to the compressed assembly for a sufficient period of time to first infuse the resin of the overlay sheets into and through the original and then to set the resin, whereby the original and the overlay sheets constitute a totally impregnated, fixedly set, essentially solid, unitary member the opposite sides of which are duplicates of the surfaces of the original.

With an openwork fabric original, such as a piece of lace, the fabric is essentially incompressible and the overlay sheets are forced into the interstices and through the openings in the lace, and in the latter case are mated to one another within said openings at substantially the median plane of the fabric. When heat is applied, the resin in the sheets flows into the interstices and at least partly if not totally impregnates the original. Also, there is an intimate fusion of the two sheets within the openings and around the edges of the original. Thereafter, with passage of time and continued application of heat, the resin is set to totally encase the original in plastic and constitute the sandwich a unitized product. Even if the fabric or other substances of the original is not capable of impregnation with the resin, there is still a resin bond between the original and the overlay sheets to constitute the sandwich a unitized product.

The pressures, temperatures and curing times employed are essentially those conventional in the art, for example, 500 to 2,000 p.s.i., 200° to 400° F. and 15 to 60 minutes.

After the resin has been set, the assembly is cooled and removed from the press, and the pads (padding sheets) and release sheets are stripped from the now unitized sandwich of the overlay sheets and the original.

This unitized structure may then be used, in conjunction with appropriate release sheets, as a caul plate for either double face or single face production of decorative plastic laminates in the manner conventional and well known in the art.

If only a single face caul is required, or if the surface configuration of the original is such as to dictate formation of only a single face caul, it is manifest that one set of the padding sheets shown in the drawing can be omitted, and the respective release sheet abutted directly against the respective press plate, so that the above-described process will produce a master caul having one flat or smooth face and only one textured face duplicative of the original.

In either event, because the original is firmly held in thermoset plastic and is essentially incompressible, this unitized caul plate will have an exceptionally long service life.

However, should the original be of exceptional value or the only one of its kind, it may be advisable to even further extend its useful service life by employing the above-described unitized sandwich structure essentially solely as a master for the production of duplicate cauls that would be used in the actual laminate molding process. This can be accomplished by using the unitized original sandwich as a master caul to form (in the usual manner) plastic laminates comprising negatives of the surface, or the respective surfaces of the original sandwich. These laminates may then be employed as single and/or opposed cauls or molds for the formation of one or more duplicates of the original.

Specifically, referring to the double face forming components of the drawing, two negative laminates can be disposed in face to face relationship in the place and stead of the two sets of padding sheets, the release sheets remain the same, and the illustrated assembly of the two overlay sheets and the consumable original is replaced by a resin impregnated pad having sufficient resiliency to receive on one or both of its sides positive or mirror duplicates of the negative impressions on the laminates. This resilient pad might, for example, comprise a plurality of the melamine impregnated alpha cellulose paper overlay sheets above described, or a suitable substitute selected within the skill of the art. This revised assembly of component parts will then be subjected to pressure and heat in essentially the same manner as previously described to produce a thermostat unitized duplicate of the original which may be used as the molding caul. While the authenticity of the reproduction and the service life of this caul could not be expected to be as faithful and good as the caul containing the original, this method does facilitate greater productive use of the original and may be highly appropriate in many cases.

In both of the above-described cauls, it is to be appreciated that the pattern and surface texture thereof are duplicates or positives of the original, and that the cauls will produce negative images of the original in the plastic laminates comprising the final product. Should it be desired to reproduce a positive image of the original in the final product, this is readily accomplished by using either of the above cauls to produce plastic laminates comprising negatives of the original, and to use these negative laminates as production molding cauls for the manufacture of positively textured plastic laminate products. The latter molding cauls may be used as single face cauls, or two of them may be placed or bonded in back-to-back relation to form a double face caul.

Thus, the objects and advantages of the invention have been shown to be attained in a convenient, economical and practical manner.

While I have shown and described what I regard to be the preferred embodiment of my invention, it is to be appreciated that various changes, rearrangements and modifications may be made therein without departing from the scope of the invention, as defined by the appended claims.

I claim:

1. Process of making textured molding cauls from original sheetlike materials that have at least one textured surface having recesses, interstices or openings therein and that would normally be damaged during molding, comprising the steps of sandwiching said textured original between a pair of sheets each impregnated with a thermosetting resin, forcing the sheet abutting said one surface of said original intimately into the recesses, interstices or openings in said surface of said original, and thermally setting the resin in said sheets to form a wear-resistant textured molding caul.

2. Process of making textured molding cauls from original sheetlike materials that have at least one textured surface having recesses, interstices or openings therein and that would normally be damaged during molding, comprising the steps of sandwiching said textured original between a pair of sheets each impregnated with a thermosetting resin, forcing the sheet abutting said one surface of said original intimately into the recesses, interstices or openings in said surface of said original, thermally setting the resin in said sheets to form a wear-resistant textured molding master, making a plastic laminate from said master to form a laminate having a textured surface, placing a resilient pad impregnated with a thermosetting resin against the textured surface of said laminate, forcing said laminate against said pad to reproduce said textured surface of said laminate on said pad, and thermally setting the resin in said pad, to form said pad into a wear-resistant textured molding caul.

3. Process as set forth in claim 1 wherein said original has recesses, interstices or openings in both surfaces thereof, including the step of forcing both of said sheets intimately into the recesses, interstices or openings in both said surfaces of said original to form a wear-resistant molding caul textured on both sides thereof.

4. Process as set forth in claim 2, including the steps of making a pair of plastic laminates from said master to form laminates each having a textured surface, sandwiching a resilient pad impregnated with a thermosetting resin between said laminates with the textured surfaces of said laminates engaging the opposite surfaces of said pad, forcing said laminates against said pad to reproduce said textured surfaces of said laminates on the opposite surfaces of said pad, and thermally setting the resin in said pad to form a wear-resistant molding caul textured on both sides thereof.